Jan. 28, 1964    C. M. COX ETAL    3,119,445
DIRECT HEAT EXCHANGE CONTROL SYSTEM
Filed Feb. 17, 1960

INVENTORS
C. M. COX
J. T. CABBAGE
BY Hudson and Young
ATTORNEYS

United States Patent Office 3,119,445
Patented Jan. 28, 1964

3,119,445
DIRECT HEAT EXCHANGE CONTROL SYSTEM
Clyde M. Cox and John T. Cabbage, Bartlesville, Okla., assignors to Phillips Petroleum Company, a corporation of Delaware
Filed Feb. 17, 1960, Ser. No. 9,217
2 Claims. (Cl. 165—32)

This invention relates to apparatus for a heat exchange control system. In one aspect it relates to means for directly heating a first liquid with another fluid.

An object of this invention is to provide an apparatus for continuously heating a first liquid with another fluid. Another object of this invention is to provide a simple and easily operable apparatus for heating one liquid by another fluid. Still another object of this invention is to provide for the continuous and automatic heating of one liquid with another fluid. Yet another object of this invention is to provide apparatus for use in heating a first liquid with a second fluid which apparatus is relatively inexpensive and simple to operate. Still other objects and advantages of this invention will be realized by those skilled in the art upon reading the following description which, taken with the attached drawing, forms a part of this specification.

Figure 1:
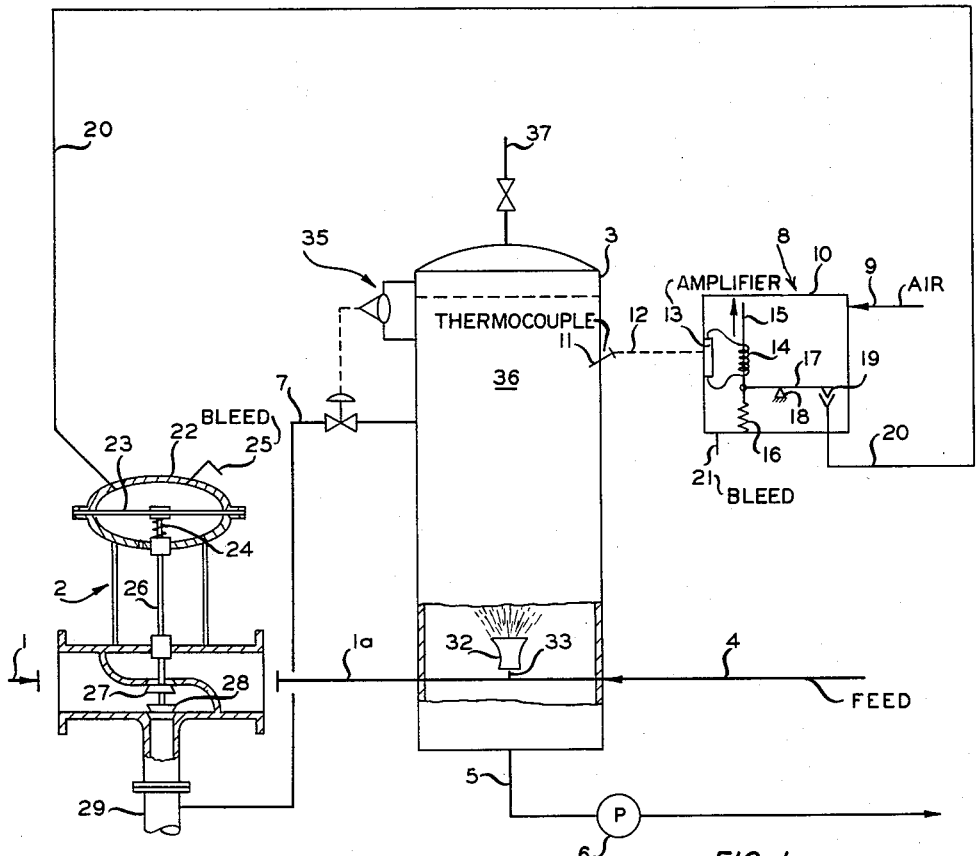
FIGURE 1 illustrates, in diagrammatic form, an arrangement of apparatus parts suitable for carrying out this invention.

In commercial plants, occasion frequently arises in which it is desired to heat a liquid from one temperature to a higher temperature with a fluid of still higher temperature, the volume of the heating fluid available not necessarily being constant. In a specific embodiment and as an example of the apparatus of this invention, we will describe apparatus for heating a relatively large volume of water from one temperature to a higher temperature with hot water from an extraneous source, the available volume of which varies. Apparatus, as in the example disclosed herein, will be described in conjunction with the method of operation.

In the drawing, reference numeral 1 identifies a pipe through which water, at varying rates, flows from a source, not shown. This water, in the example as given herein, is condensed steam at approximately 100 p.s.i.g. (pounds per square inch gauge) and at 250° F. Since this water can originate from several sources in ordinary plant operation, the volume available for passing through pipe 1 is not necessarily constant. This hot condensate water passes into a three-way throttle valve 2, a portion of the water passing a valve head 27 and on through pipe 1a into a mixing tank 3. The hot water not passing around valve head 27 and into tank 3 passes around valve head 28 and is discharged from the system through a pipe 29. Water at 120° F. and at about 15 p.s.i.g. originates from a source, not shown, and is passed through a pipe 4 into the mixing tank. These two streams of water issue from pipes 1a and 4 through a nozzle 33 as a jet of liquid. If desired, a sleeve 32 can be positioned around the nozzle so as to form an inspirator. When the sleeve is employed, water jetting rapidly from nozzles 33 draws water from the lower end of sleeve 32 and discharges it from the opposite end of the sleeve along with the jetted water in a general mixing operation. Further mixing occurs as the water from these sources flows rapidly upward in the tank in the body of water 36 normally maintained in the tank. This body of water is maintained in the tank by a liquid level float controller assembly 35. This liquid level float controller assembly operates to allow water to flow through a pipe 7 in response to the operation of a float of the control assembly when the level of liquid in the tank reaches such a level as to lift the float above a predetermined level. The construction and operation of liquid level float controller assemblies are well understood by those skilled in the process control art, and will not be further described herein for purposes of brevity.

Figure 4:
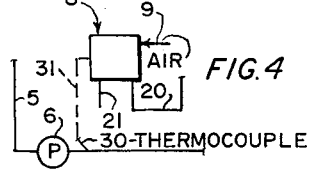
FIGURE 4 illustrates an alternate embodiment of a portion of the apparatus of FIGURE 1.

Heated liquid for subsequent process use at 140° F. is withdrawn from the vessel through a pipe 5 by a pump 6 for subsequent plant use as desired. In order to control the heating of the 120° F. water by the hot condensate at 250° F., a temperature sensing device such as a thermocouple 11 is positioned within the normally liquid containing space of tank 3, or alternately a thermocouple 30 can be positioned in the discharge pipe 5 at, for example, the location illustrated. When thermocouple 30 is used, it is connected with a controller 8 by leads 31 (FIGURE 4); or, when thermocouple 11 is used, it is connected to the controller by leads 12 (FIGURE 1). As is known, a temperature change in a thermocouple causes generation of a smalle E.M.F. and this electrical signal is conducted through leads 12 to an amplifier 13. The amplifier signal from amplifier 13 energizes the solenoid coil 14 and an armature 15 therein rises in proportion to the amplified signal. This armature tends to resist upward movement by being attached to a tension spring 16, as illustrated. One end of a lever arm 17 is attached to the lower end of armature 15 and a valve head 19 is fixed to the other end of the lever arm. Valve motor actuating air enters case 10 of the controller 8 through a tube 9 and a regulated pressure of air is effected by a valve head 19 through tube 20 to the motor of the throttle valve 2. The lever arm 17 is pivoted around a fulcrum 18 so that upon elevation of armature 15 the valve head 19 moves downward.

Upon increase of air pressure above diaphragm 23, the diaphragm is forced downward. A valve stem 26 is attached to diaphragm 23 as illustrated. A compression spring 24 is positioned as illustrated in order to maintain valve head 27 in a normally closed position. When valve head 27 is moved upward against its seat in a fully closed condition, valve head 28 is then fully open from its seat. Thus, when pressure from controller 8 through tube 20 forces diaphragm 23 downward, valve head 27 is opened somewhat from its seat and valve 28 then becomes partially closed to restrict liquid flow around valve head 28 which operation allows a portion of the liquid to flow around valve head 27 into tank 3. This control apparatus is so adjusted that when the temperature of the liquid in tank 3 reaches a value higher than 140° F., this higher temperature produces an increased signal from thermocouple 11, which signal is amplified and the amplified signal elevates armature 15 with the resultant downward movement of valve head 19. This downward movement of valve head 19 restricts air flow into tube 20 with the result that there is a reduction of pressure above diaphragm 23 and the compression spring 24 raises the valve stem to close at least partially the valve head 27 with respect to its seat, thereby decreasing the rate of hot liquid flow around valve 27 and into tank 3. All the while, feed liquid, which is herein stated to be water, is continually flowing into tank 3. Thus, a certain flow rate of heating water is always required, or substantially always required, to be passed into tank 3 for heating the feed water.

In case heated water at the aforementioned 140° F. is withdrawn from tank 3 at a rate less than the combined rates of introduction of feed water through pipe 4 and heating water through pipe 1a, the level of the body of water 36 tends to rise. This rise of liquid level in tank 3 actuates the float of the float controller assembly 35 with the result that sufficient water is withdrawn from the tank through pipe 7 to maintain the predetermined level. As a matter of convenience, the overflow water from pipe 7 is combined with any reject water flowing around valve 28 for common disposal. If it is desired, however, to maintain the excess hot water flowing around valve 28 separate from the overflow water, it can be accomplished merely by disconnecting pipe 7 from pipe 29.

A housing 22 in conjunction with diaphragm 23 maintains a volume above the diaphragm such as is always required in a diaphragm motor. A bleed nozzle 25 is positioned in housing 23 for the continual and uniform bleeding of pressure air. A conventional bleed nozzle 21 is provided in case 10 to assist in pressure regulation in the controller case 10. The need and use of such air bleeds is well understood in the pneumatic control instrument art.

Tank 3 is provided with a valved vent line 37 in case pressure reduction from this tank is ever required.

The following tabulation summarizes the example described hereinabove as follows:

Tank 3—Heated water at 140° F., 10 p.s.i.g.;
Pipe 4—Feed water at 120° F., and 15 p.s.i.g., 100 pounds water per minute;
Pipe 1a—Condensate water at 250° F., 18 [1] pounds water per minute;
Pipe 5—118 pounds heated product water per minute at 140° F.

Figure 2:
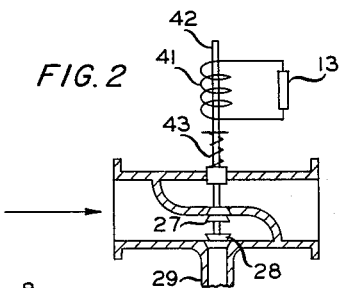
FIGURE 2 illustrates an alternate form of a portion of the apparatus of FIGURE 1.
Figure 3:
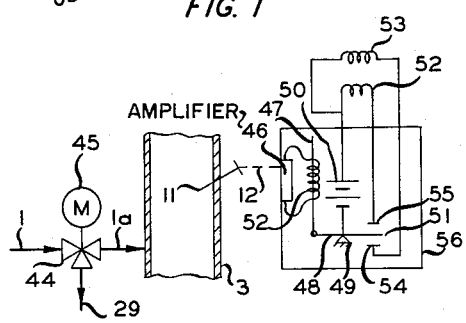
FIGURE 3 illustrates an alternate form of a portion of the apparatus of FIGURE 1.

While a particular three-way throttle motor valve 2 is described for exemplary purposes, it is realized by those skilled in the art that other suitable three-way throttle motor valves can be used. FIGURE 2 illustrates a solenoid actuated three-way throttle valve which can be used for the heating flow control. In this case, amplifier 13 receives a signal from thermocouple 11 or thermocouple 30 and actuates an armature 42 of a solenoid 41. This armature serves as a valve stem to which valve heads 27 and 28 are attached. Spring 43 is a tension spring and tends to make valve 27 a normally opened valve. Energizing of solenoid 41 moves armature 42 upward to close valve 27 onto its seat. As illustrated in FIGURE 3, an electric motor-driven throttle valve can be used. In this case, the electric motor driving a valve stem corresponding to valve stem 26 is a reversible motor and lever arm 48 actuates a relay operating in conjunction with the field windings for operation of the reversible motor.

FIGURE 3 illustrates a three-way valve actuated by a reversible motor. Motor 45 actuates the three-way valve in response to electric current from a controller 56. When temperature in tank 3 as sensed by thermocouple 11 is too low, the signal from amplifier 46 is also low and armature 47, for example, moves downward. Contact 51 on the end of arm 48 pivoted at 49, moves upward to close a circuit by way of contact 55 thereby energizing a winding 52 in motor 45 to cause the motor to open valve 44 to permit a greater flow of hot liquid to the tank. When thermocouple 11 senses a temperature higher than a predetermined temperature, the signal from amplifier 46 causes armature 47 in coil 52 to rise, thereby opening the circuit through contact 55 and closing the circuit through contact 54 which energizes the reversed winding 53 in the motor 45. This motor then throttles liquid flow to tank 3 and opens up flow to pipe 29.

[1] Total to valve 2 is 35# condensate; 18# to tank 3, 17# via pipe 29.

Furthermore, any suitable type of liquid level controller can be used in place of the conventional float controller 35 as disclosed herein. Also, other liquids can serve as the heating liquid and liquid to be heated dependent upon the materials in process. The operation is also applicable to heating a liquid with a vapor, as heating water with steam. In this case, steam passes through the three-way valve. Also, the operation can be used for heating one gas or vapor with another gas or vapor, as for example, heating ethylene with steam.

While certain embodiments of the invention have been described for illustrative purposes, the invention obviously is not limited thereto.

We claim:

1. An apparatus for heating one liquid with another fluid, the rate of flow of this latter fluid being irregular, comprising, in combination, a vessel, a first conduit in communication with said vessel for inlet of liquid to be heated, a second conduit in communication with said vessel for inlet of heating fluid, a hot fluid and a cold liquid mixer positioned in said vessel, said mixer comprising a nozzle, one end of said nozzle being operatively attached to the ends of said first and second conduits in such a manner that fluid from said first and second conduits passes through said nozzle, the other end of said nozzle being pointed in an upward direction, a sleeve having both ends opened and being positioned with its axis in said upward direction and at least near said nozzle in such a manner that liquid jetted through said nozzle also passes through said sleeve thereby drawing liquid from said vessel and passing same through said sleeve in an inspirating action whereby liquids entering said vessel through said nozzle are mixed with liquid in said vessel, a third conduit in communication with the lower and normally liquid containing portion of said vessel for outlet of heated liquid, a three-way motor valve in said second conduit for regulation of flow of heating fluid therein, said motor valve having a motor operatively connected thereto, a fourth conduit in communication with said motor valve for outlet of excess heating fluid from said second conduit not required in said vessel, a temperature sensing means in the normally liquid containing portion of said vessel, a temperature responsive fluid pressure controller in operative communication with said sensing means and with the motor of said motor valve, and said controller being adapted to regulate fluid pressure to said motor in response to temperature in said vessel as sensed by said sensing means whereby said motor valve regulates the flow of heating liquid in said second conduit.

2. Apparatus in accordance with claim 1 further comprising a fifth conduit in communication with the normally liquid containing space of said vessel for outlet of over-flow liquid, a second motor valve in said fifth conduit, a liquid level float controller in operable communication with a predetermined level of liquid in said vessel and with said second motor valve whereby said liquid level controller actuates said second motor valve in response to the level of liquid in said vessel as sensed by the float of said float controller.

References Cited in the file of this patent

UNITED STATES PATENTS

| | | |
|---|---|---|
| 2,339,903 | Alexander | Jan. 25, 1944 |
| 2,372,533 | Torbett | Mar. 27, 1945 |
| 2,681,149 | Shuldener | June 15, 1954 |